United States Patent [19]

Suzuki

[11] Patent Number: 5,122,831
[45] Date of Patent: Jun. 16, 1992

[54] PHOTOGRAPHIC PRINTER

[75] Inventor: Kenji Suzuki, Kanagawa, Japan

[73] Assignee: Fuji Photo Film Co., Ltd., Kanagawa, Japan

[21] Appl. No.: 720,963

[22] Filed: Jun. 25, 1991

[30] Foreign Application Priority Data

| | | | |
|---|---|---|---|
| Jun. 25, 1990 | [JP] | Japan | 2-166274 |
| Jun. 25, 1990 | [JP] | Japan | 2-166275 |
| Jun. 25, 1990 | [JP] | Japan | 2-166277 |
| Jun. 28, 1990 | [JP] | Japan | 2-171144 |
| Jun. 28, 1990 | [JP] | Japan | 2-171145 |
| Aug. 2, 1990 | [JP] | Japan | 2-205720 |
| Aug. 2, 1990 | [JP] | Japan | 2-205721 |
| Aug. 15, 1990 | [JP] | Japan | 2-215285 |

[51] Int. Cl.$^5$ .................. G03B 27/54; G03B 27/72
[52] U.S. Cl. .................................................. 355/37
[58] Field of Search ............... 355/32, 35, 37, 38, 355/328; 358/80; 359/36, 45, 48, 49, 66, 68

[56] References Cited

U.S. PATENT DOCUMENTS

| | | | |
|---|---|---|---|
| 3,761,172 | 9/1973 | Letzer | 355/37 X |
| 4,933,754 | 6/1990 | Reed et al. | 358/76 |
| 4,989,032 | 1/1991 | Hull et al. | 355/38 |

Primary Examiner—Richard A. Wintercorn
Attorney, Agent, or Firm—Sughrue, Mion, Zinn, Macpeak & Seas

[57] ABSTRACT

A photographic printer having a color liquid crystal panel disposed between a light source and a photographic film. The color liquid crystal panel adjusts the light intensity and color balance of the light from the light source. The color liquid crystal panel has a plurality of cells disposed in a matrix, each cell having a light valve whose light transmittance changes with the drive voltage applied to the cell and a color filter of one of the three primary colors. The color liquid crystal panel is used as light amount controlling means, a shutter, or as both of them. According to the preferred embodiment of the present invention, the light transmittance of each cell is individually adjusted to correct the exposure unevenness and/or adjust the gradation.

25 Claims, 15 Drawing Sheets ively. In practice designs and manufactures,

PHOTOGRAPHIC PRINTER

BACKGROUND OF THE INVENTION

1. Field of the Invention

The present invention relates to a photographic printer, and more particularly, to a photographic printer which uses a color light intensity control panel having a plurality of cells disposed in a matrix and can adjust the color balance and intensity of a printing light with high precision.

2. Description of the Prior Art

With a conventional photographic printer, characteristic values such as large area transmittance densities (LATD) of red, green, and blue colors are first obtained through photometry of a photographic film such as a negative film, and then the exposure amount for each color is calculated using the characteristic values. In accordance with the calculated exposure amount of each color, the positions of cyan, magenta, and yellow color filters within the printing optical path are changed to adjust the color balance and intensity of a printing light and print a color image of good quality on a color paper.

A photographic printer using three primary color filters, however, requires a filter driver for inserting each color filter into the printing optical path, and a mixing box for uniformly and sufficiently diffusing the printing light transmitted from the three color filters, the mixing box being constructed of a rectangular tube having an inner mirror surface and diffusing plates at opposite ends thereof. These components become an obstacle against realizing a compact and low-cost photographic printer. Furthermore, color filters are required to be advanced and retracted, resulting in a complicated structure of the printer and a possible failure in durability and reliability. Still further, it is difficult to control the mixing characteristics of a mixing box.

The gradation of a negative film or a color paper is uniquely determined from the characteristics of the same photosensitive material. Therefore, a problem arised in that it is difficult for a photoprint to be finished either in a soft gradation or a high gradation as desired. Furthermore, both the bright and dark portions of a high-contrast subject cannot be reproduced, but one of the portions results in poor gradation, because of the specific characteristics of photosensitive material. Still further, a frame of extremely under-exposure or over-exposure loses its gradation balance, making a proper color reproduction impossible.

A photographic printer uses various optical elements such as lamps, filters, a printing lens, a black shutter, and the like. If the characteristic of an optical element changes at each local position thereof, density unevenness (irregularity) and color unevenness (irregularity) will be produced on a photoprint. Density and color unevenness caused by the insertion of color filters can be eliminated by a mixing box. Density and color unevenness caused by a peripheral light amount ratio of a printing lens is corrected by using an optical element having a characteristic opposite to such an unevenness pattern, such as a parabolic filter or color filter.

However, unevenness of a light emission intensity of a lamp (light source unevenness) changes from one lamp to another. In practical designs and manufactures, it is difficult to manage the unevenness characteristic of each lamp so as to make it substantially constant. Although such unevenness can be dissolved by using a mixing box having a high diffusion degree, the light amount of a printing light lowers greatly, resulting in a low printing speed. In the case of a printing lens, an unevenness pattern of a printing lens changes with a magnification factor of the lens. Therefore, it is necessary for a photographic printer having a variable printing magnification factor to prepare a plurality of filters according to the number of magnification factors, which is not suitable for practical use. A black shutter also produces exposure unevenness which changes with an exposure time.

SUMMARY OF THE INVENTION

It is, therefore, a principal object of the present invention to provide a photographic printer having a compact and simple structure.

It is another object of the present invention to provide a photographic printer with improved durability and reliability without mechanically movable parts.

It is a further object of the present invention to provide a photographic printer capable of finely controlling an exposure amount.

It is yet another object of the present invention to provide a photographic printer capable of making a photoprint having a desired gradation and properly printing a color image of a frame even if it has a three-color unbalanced gradation, such as an unsatisfactorily exposed frame.

It is a still further object of the present invention to provide a photographic printer capable of making scratches and dust on a photographic film inconspicuous.

It is an additional object of the present invention to provide a photographic printer capable of correcting density and color unevenness caused by optical elements.

The foregoing and other objects of the present invention are achieved by the provision of a color light intensity controlling means having a plurality of cells disposed in a matrix. This color light intensity controlling means is used as a light amount adjusting means or a shutter. When used as the light amount adjusting means, the color light intensity controlling means is caused to change its light transmittance in accordance with an exposure amount and/or an exposure unevenness correction value. When used as a shutter, the color light intensity controlling means is controlled to selectively operate in either a light intercepting state or a light transmitting state. Each cell is constructed of a light valve, whose light transmittance changes with a voltage applied thereto, and a color filter of one of three primary colors. Cells for three primary colors are disposed uniformly on the color light intensity controlling means, dispensing with a mixing box having a high diffusion characteristic. Even if a mixing box becomes necessary, a mixing box having a low diffusion characteristic, such as a mixing plate, can be used satisfactorily.

According to a preferred embodiment of the present invention, as the color light intensity controlling means, a color liquid crystal panel is used. The color liquid crystal panel is constructed of a liquid crystal panel having a number of liquid crystal elements (light valve) disposed in a matrix, and a color filter having three primary color filter segments disposed in a mosaic pattern. In order to protect the color liquid crystal panel, there are disposed an infrared ray cut filter and an ultraviolet ray cut filter between a light source and the color liquid crystal panel. It would be difficult for a three primary color mosaic filter to control a red light. Therefore, it is preferable to use a liquid crystal panel dedicated only for controlling the red light. In this case, light from the light source is controlled using two types of color liquid crystal panels for red and for green and blue colors, respectively.

For adjusting the gradation, each point (picture element) in a frame is photometrically measured, and the light transmittance of each cell is adjusted by the photometric value measured at each point of the frame. In accordance with the type of frame, such as a high contrast frame, under-exposure frame, or over-exposure frame, the light transmittance of each cell is adjusted so that even a frame with insufficient exposure can be printed with good image quality.

According to another preferred embodiment of the present invention, the relationship between a drive signal and a light transmittance of each cell is previously measured, and the light transmittance of the cells is adjusted for each color in accordance with previously obtained data. The light transmittance can be correctly set even where a nonlinearity exists between a drive signal and a light transmittance and the variations of characteristics of the color liquid crystal panel. The light transmittance of each cell may be adjusted in accordance with the data measured for the cell.

In accordance with a still further embodiment of the present invention, a negative film developed without exposure is set at the printing stage. Light transmitted through the film is measured to detect the density/color unevenness caused by optical elements disposed in the printing optical path, and the obtained data is written in a memory. When a frame is exposed, the data read from the memory is used to adjust the light transmittance of each cell individually and correct the density and color unevenness.

According to the present invention, there is provided a color light intensity controlling means such as a color liquid crystal panel, and the light transmittance or the period of maintaining the light transmitting state is controlled in accordance with an exposure amount of each color. As a result, it is not necessary to provide movable color filters, a filter driver for setting the filters within the printing optical path, and a mixing box, thereby making the system simple and compact. Furthermore, since no mechanical moving parts are included, the durability and reliability can be improved. Still further, the light transmittance of each cell of the color light intensity controlling means is adjusted in accordance with the characteristics of optical elements and frames. Therefore, it is possible to eliminate the density and color unevenness or adjust the gradation, allowing the printing of a color image of good quality on color paper.

BRIEF DESCRIPTION OF THE DRAWINGS

The above and other objects and advantages of this invention will become apparent to the person skilled in the art from the following detailed description of the invention when read in conjunction with the accompanying drawings, in which.

DETAILED DESCRIPTION OF THE PREFERRED EMBODIMENTS

Figure 1:
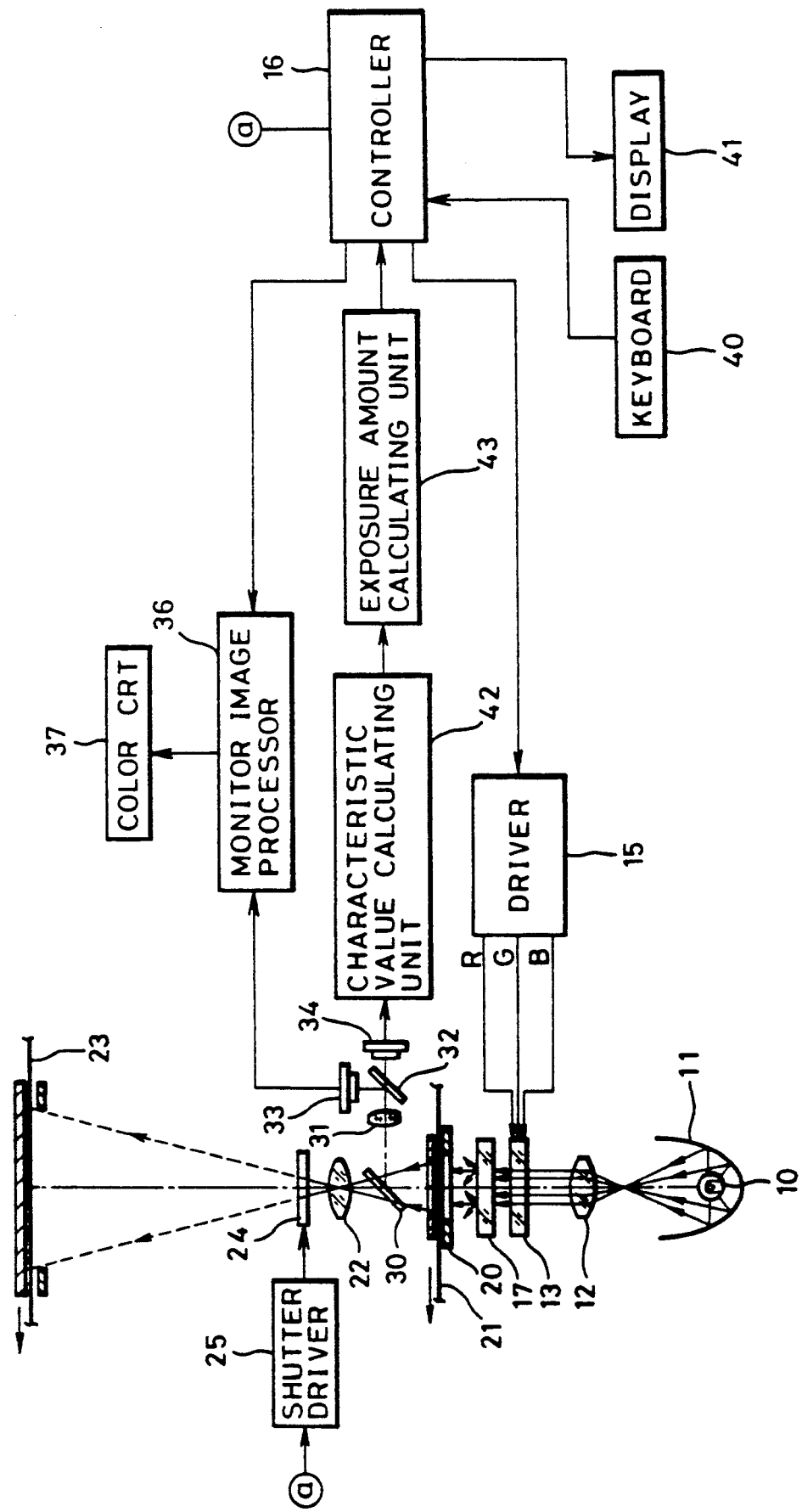
FIG. 1 is a schematic diagram showing the structure of a photographic printer.

Referring to FIG. 1 showing the outline of a photographic printer, a lens 12 is disposed in front of a lamp 10. Light emanating from the lamp 10 is converted into a parallel light which in turn is incident to a color liquid crystal panel 13. Light directed toward the back of the lamp 10 is reflected forward by a reflector 11 and is applied to the lens 12. It is preferable to dispose a heat intercepting filter between the lamp 10 and lens 12 in order to protect the color liquid crystal panel 13 from heat.

Figure 2:
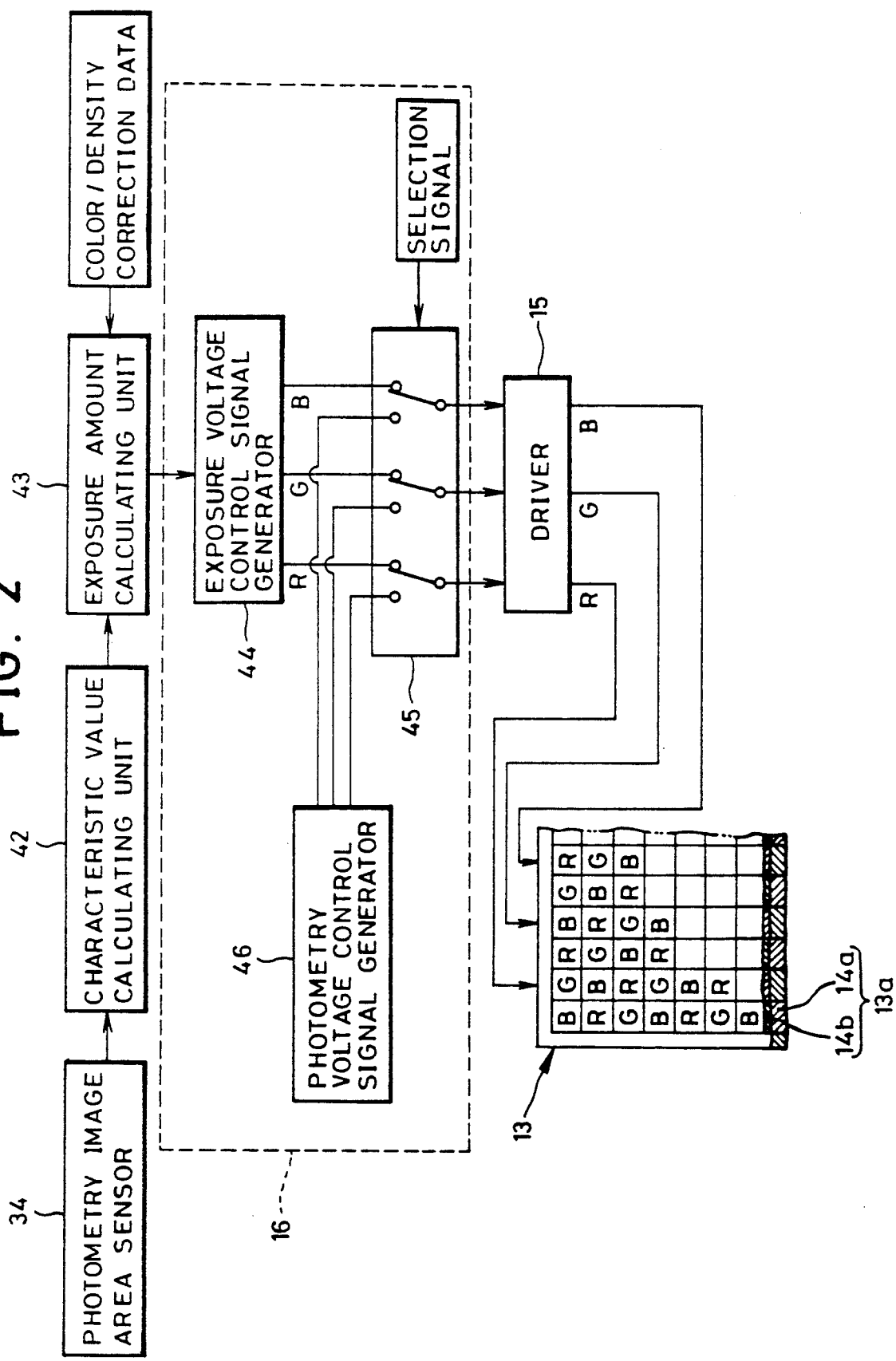
FIG. 2 is a functional block diagram showing a controller according to an embodiment which uses a color liquid crystal panel for adjusting a light amount.

The color liquid crystal panel 13 is constructed of known active matrix liquid crystal display elements and mosaic filters evaporated upon or attached to the display elements. The color liquid crystal panel 13 is thus formed with a plurality of cells 13a disposed in matrix as shown in FIG. 2. The cells 13a are classified into three types including red cells, green cells, and blue cells, depending upon their color filter segments. These three types of cells are alternately disposed. Each cell 13a is constructed of a light valve 14a whose light transmittance changes with the voltage applied thereto, and a color filter segment 14b formed on the light valve 14a. The light transmittance of each cell 13a of the color liquid crystal panel 13 is controlled via a driver 15 by a controller 16 constructed of a microcomputer. The driver 15 has a D/A converter which applies a voltage corresponding to an input signal to each cell 13a.

In this embodiment, the color liquid crystal panel 13 is of a normally open type wherein each light valve 14a exhibits maximum light transmittance (open state) when no voltage is applied. Instead, a color liquid crystal panel of a normally closed type may be used which exhibits minimum light transmittance (closed state or light intercepting state) when no voltage is applied. It is sufficient that the color liquid crystal panel 13 has 20×20 cells. The number of cells may be larger if necessary.

There is disposed above the color liquid crystal panel 13 a diffusion plate 17 made of, e.g., a glass plate and an opal glass on the surface of which fine irregularities are formed. The diffusion plate 17 diffuses light transmitted through the color liquid crystal panel 13 so that a uniform intensity and color balance can be obtained. Light transmitted from the diffusion plate 17 illuminates a frame of a photographic film such as a negative film 21 set on a film carrier 20. As is well known, this film carrier 20 sets a frame at the printing stage when detecting the edge of the frame.

An image on a frame to be printed is focussed by a printing lens 22 onto a color paper 23 set at an exposure stage. Between the printing lens 22 and color paper 23, there is disposed a black shutter 24 which is opened and closed by a shutter driver 25. Between the film carrier 20 and the printing lens 22, a half mirror 30 is disposed so that a portion of the light transmitted through the negative film 21 is reflected in the lateral direction and guided to a monitor optical path Light entering the monitor optical path is focussed by a lens 31 and a half mirror 32 onto a monitor image area sensor 33 and photometry image area sensor 34. Both the sensors 33 and 34 are of a single plate type and have mosaic filters on their light receiving surfaces. The monitor image area sensor 33 has a considerably large number of pixels in order to display a highly fine and precise image. The photometry image area sensor 34 may have a relatively small number of pixels, and it is preferable to have the same number of pixels as the cells of the color liquid crystal panel 13. Instead of the half mirror 30, a beam splitter may by used or a movable mirror may be inserted into or retracted from the printing optical path. Also, instead of the half mirror 32, a beam splitter may be used.

The monitor image area sensor 33 picks up a negative image on a frame to be printed, and sends red, green, and blue three color signals to a monitor image processor 36. As is well known in the art, the monitor image processor 36 performs an A/D conversion, negative/positive conversion, gradation correction, chroma correction, and D/A conversion, and displays a monitor image simulating a photoprint on a color CRT 37. With the chroma correction, a difference is corrected between a spectral sensitivity of the color paper 23 and that of the image area sensor 33. Correction data is entered by manually actuating keys of a keyboard 40 connected to the controller 16. The entered density correction data and color correction data are displayed on a display 41 and sent to the monitor image processor 36 to correct the displayed monitor image using the supplied correction data.

The photometry image area sensor 34 carries out pseudo three color separation and photometry for each point on a frame to be printed. The obtained three color signals are sent to a characteristic value calculating unit 42 and converted into digital signals to calculate characteristic values such as an LATD, maximum density, particular area transmittance density, and the like, respectively for each color. These characteristic values are supplied to an exposure amount calculating unit 43, where red, green, and blue exposure amounts are calculated using well known exposure amount equations, and, thereafter, they are supplied to the controller 16. In this case, correction data entered from the keyboard 40, if any, are considered for calculating characteristic values.

Referring to FIG. 2, an exposure voltage control signal generator 44 is constructed of a table memory in which table data representative of the relationship between exposure amounts and corresponding voltage control signals has been previously stored. The table data is prepared for each color and obtained through preparatory experiments. This exposure voltage control signal generator 44 converts red, green, and blue exposure amounts into red, green, and blue voltage control signals. These voltage control signals are sent to the driver 15 via a selector 45. The driver 15 produces a voltage corresponding to the digital red voltage control signal and applies it to red cells. Similarly, a voltage corresponding to the green voltage control signal is supplied to green cells, and a voltage corresponding to the blue voltage control signal is supplied to blue cells. The cells 13a are therefore driven by the applied voltages to have desired light transmittances. While the color liquid crystal panel 13 is driven, the controller 16 causes the shutter driver 25 to open the black shutter 24 for a predetermined time period so that an image on the frame of the negative film 20 is created on the color paper 23.

In a monitoring system, the color CRT 37 displays a color image of a finished photoprint to be made when light of a predetermined intensity is incident on the monitor image sensor 33. The originally narrow dynamic range of the sensor 33 is thus set to cover the intensity of light. Therefore, if the incident light intensity is too large, the sensor 33 will saturate. For this reason, during the photometry mode the controller 16 causes the selector 45 to connect the photometry voltage control signal generator 46 to the driver 15, so that the cells 13a are caused to have optimum light transmittances. As is well known, the image area sensor 33 as well as the image area sensor 34 is constructed of alternately disposed red, green, and blue pixels which have different sensitivities depending upon their filter colors. It is, therefore, preferable to adjust the light transmittances in accordance with colors. An optimum photometry can be performed by reducing the light amount incident to the color liquid crystal panel 13 so as to match the dynamic range of the image area sensors 33. Such optimum voltage control signals for the photometry mode have been previously determined also by experiments. The substantial dynamic range of the image area sensor 34 is widened, because the charge storage time can be controlled so as to shift its original dynamic range. If the image area sensor 34 has a largely different dynamic range from that of the image area sensor 33, the color liquid crystal panel 13 is driven first by voltages suitable for the dynamic range of the image area sensor 33 to pick up a negative image, and then the panel 13 is driven by voltages suitable for the dynamic range of the image area sensor 34 to carry out photometry. Voltages to be applied suitably for the different dynamic ranges have been previously obtained.

Figure 3:
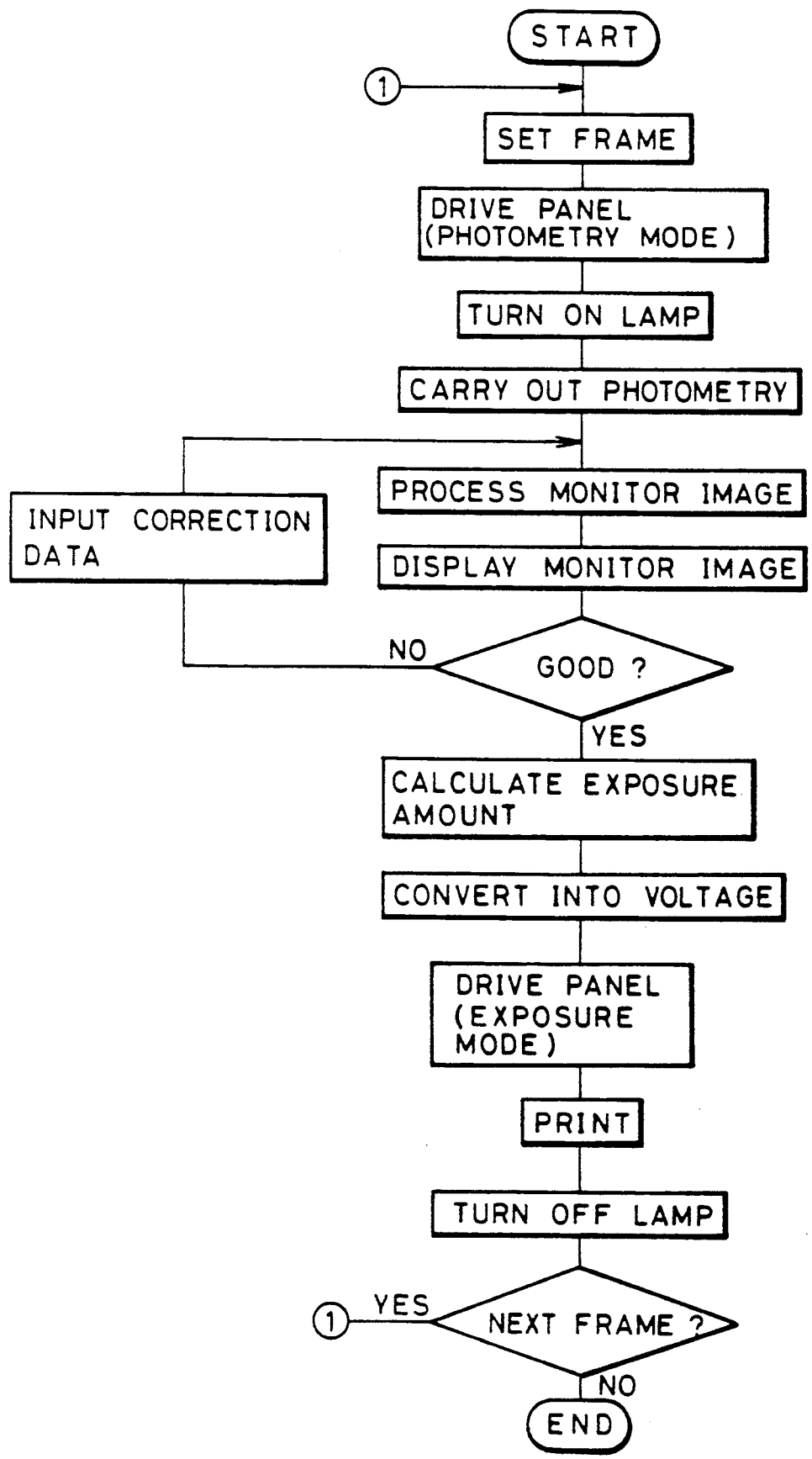
FIG. 3 is a flow chart illustrating the printing procedure of the embodiment shown in FIG. 2.

Next, the operation of this embodiment will be described with reference to FIG. 3. The negative film 21 is set to the film carrier 20, and a frame feed key of the keyboard 40 is actuated so that the film carrier 20 feeds the negative film 21 to set the subject frame to the printing stage. Next, voltage control signals are sent from the photometry voltage control signal generator 46 to the driver 15. In this photometry mode, the cells 13a for each color of the color liquid crystal panel 13 are driven to have optimum light transmittances suitable for the dynamic range of the image area sensors 33. When the lamp 10 is turned on, the intensity and color balance of light emanating from the lamp 10 are adjusted by the color liquid crystal panel 13 set in the photometry mode. The adjusted light is diffused by the diffusion plate 17, and thereafter illuminates the frame to be printed. Light transmitted through this frame is made incident to the image area sensors 33 and 34 via the half mirror 30, lens 31, and half mirror 32.

Red, green, and blue three color signals output from the image area sensor 33 are processed by the monitor image processor 36 to display a monitor image simulating a finished photoprint on the color CRT 37. If it is judged from the displayed monitor image that the density and color are required to be corrected, density correction data and color correction data are entered through the keyboard 40. The entered correction data is sent via the controller 16 to the monitor image processor 36. The monitor image corrected by the correction data is then displayed on the color CRT 37. If it is judged from the corrected monitor image that correction is again required, correction data is entered again. If the finished image quality is anticipated to be good, a print key of the keyboard 40 is actuated to start printing.

In the meantime, red, green, and blue three color signals output from the image area sensor 34 are supplied to the characteristic value calculating unit 42 to derive therefrom the characteristic values such as LATD for each color. Upon actuation of the print key as described above, the controller 16 causes the selector 45 to select the exposure voltage control signal generator 44. Also upon actuation of the print key, the correction data as entered is settled. The correction data and various characteristic values are substituted into well known exposure amount equations to calculate the red, green, and blue exposure amounts. Next, the controller 16 generates a voltage control signal corresponding to the calculated exposure amount of each color, and sends it to the driver 15. The driver 15 drives the cells at respective voltages specific to the colors. The cells 13a of the color liquid crystal panel 13 under the exposure mode are set to light transmittances specific to the colors. Light adjusted by the color liquid crystal panel 13 illuminates the subject frame, when the black shutter 24 is opened. Therefore, the subject frame is projected upon the color paper 23. When the black shutter 24 is closed after a predetermined time period, the exposure of the color paper 23 is completed. After the exposure is completed, the applied voltages to the color liquid crystal panel 13 are removed so that the cells 13a take the maximum light transmittance.

If the variable step (resolution) of light transmittance of the cells cannot be made sufficiently fine, the number of cells to be driven is decreased gradually to allow a finer exposure amount control. In such a case, a color liquid crystal panel having a larger number of cells is used to reduce the influence of driving cells while thinning. Furthermore, in addition to the adjustment of light transmittances of the cells, the time of maintaining each determined light transmittance may be adjusted and thereafter the cells of each color are set to the light intercepting state, thereby allowing a finer exposure control.

If the diffusion plate 17 is omitted in order to provide a more compact photographic printer, scratches or dust on the negative film 21 become conspicuous because of parallel light transmitted through the color liquid crystal panel 13. If the color liquid crystal panel 13 is disposed nearer to the negative film 21, since the panel 13 uses mosaic filters, color unevenness will be generated more or less. Further, the gradation of a photoprint will be of a high gradation because the negative film 21 is illuminated by parallel light. In order to solve such problems, a diffusion plate 17 is used which has a weaker diffusion capability than a mixing box and which makes it easier to control the diffusion characteristic. However, in the case where only scratches or dust on the negative film 22 are intended not to be printed conspicuously, if the color liquid crystal panel 13 is spaced apart from the negative film at the de-focussing position of the printing lens 22, then the diffusion plate 17 can be omitted.

Figure 4:
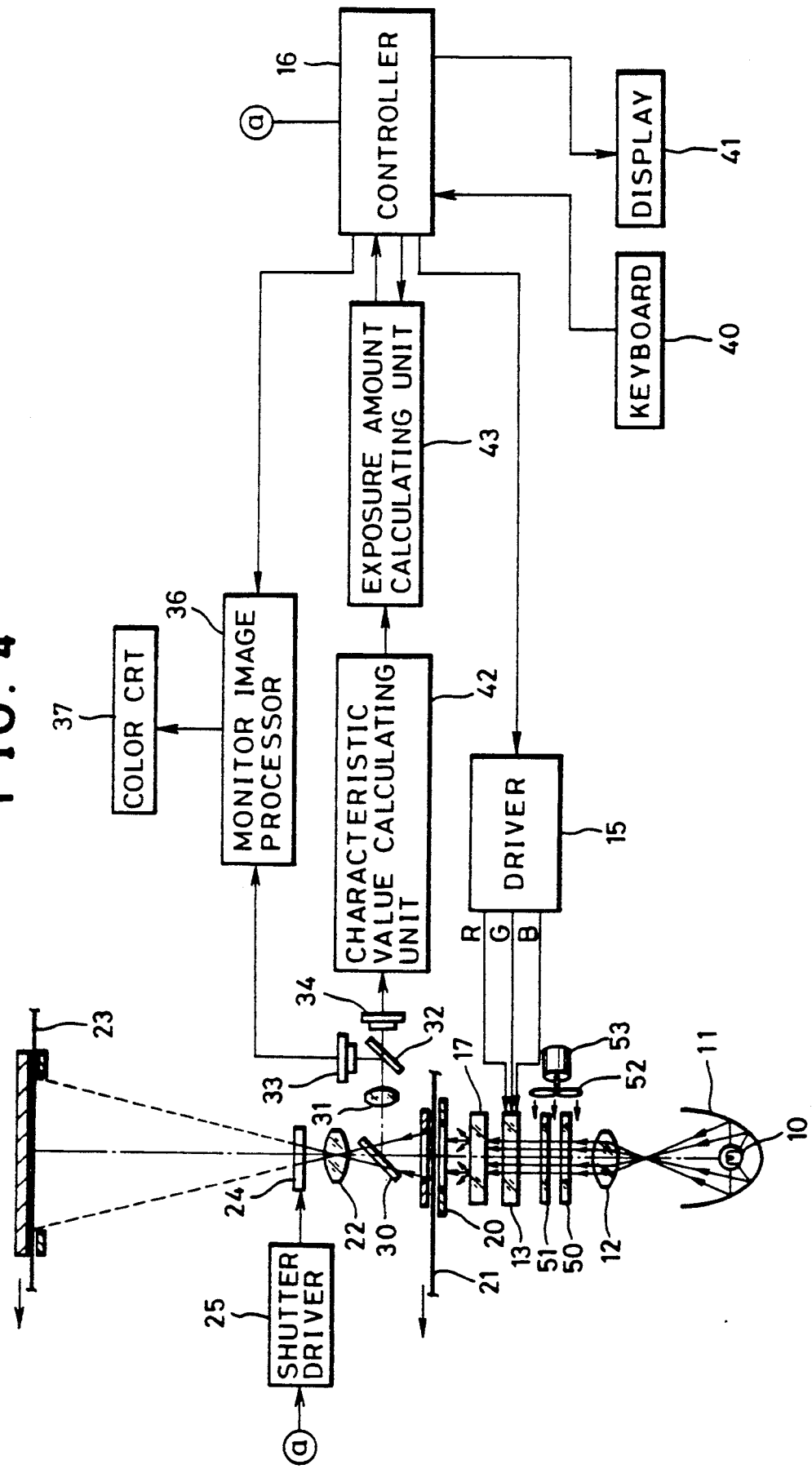
FIG. 4 is a schematic diagram of a photographic printer according to an embodiment which disposes an ultraviolet ray cut filter and an infrared ray cut filter between a light source and a color liquid crystal panel.

The lamp 10, providing a large amount of light on the order of 0.5 to 1.0 kW, is used to shorten the printing time. The operation of the color liquid crystal panel 13 may sometimes become unstable because of heat from the lamp 10. The color liquid crystal panel 13 may deteriorate in some cases by ultraviolet light from the lamp 10. FIG. 4 shows an embodiment which protects the color liquid crystal panel 13 from heat and ultraviolet rays. In FIG. 4, like elements to those shown in FIG. 1, are represented by using identical reference numerals. Between the lens 12 and color liquid crystal panel 13, there are disposed an infrared ray cut filter 50 and an ultraviolet ray cut filter 51 for the purpose of preventing a temperature rise of the liquid crystal panel 13 by infrared rays from the lamp 10 and preventing a deterioration of the color liquid crystal panel 13 by ultraviolet rays from the lamp 10. A cooling fan 52 driven by a motor 53 directs external atmospheric air to the cut filters 50 and 51 to prevent a temperature rise thereof and to exhaust heated air around the lamp 10.

Figure 5:
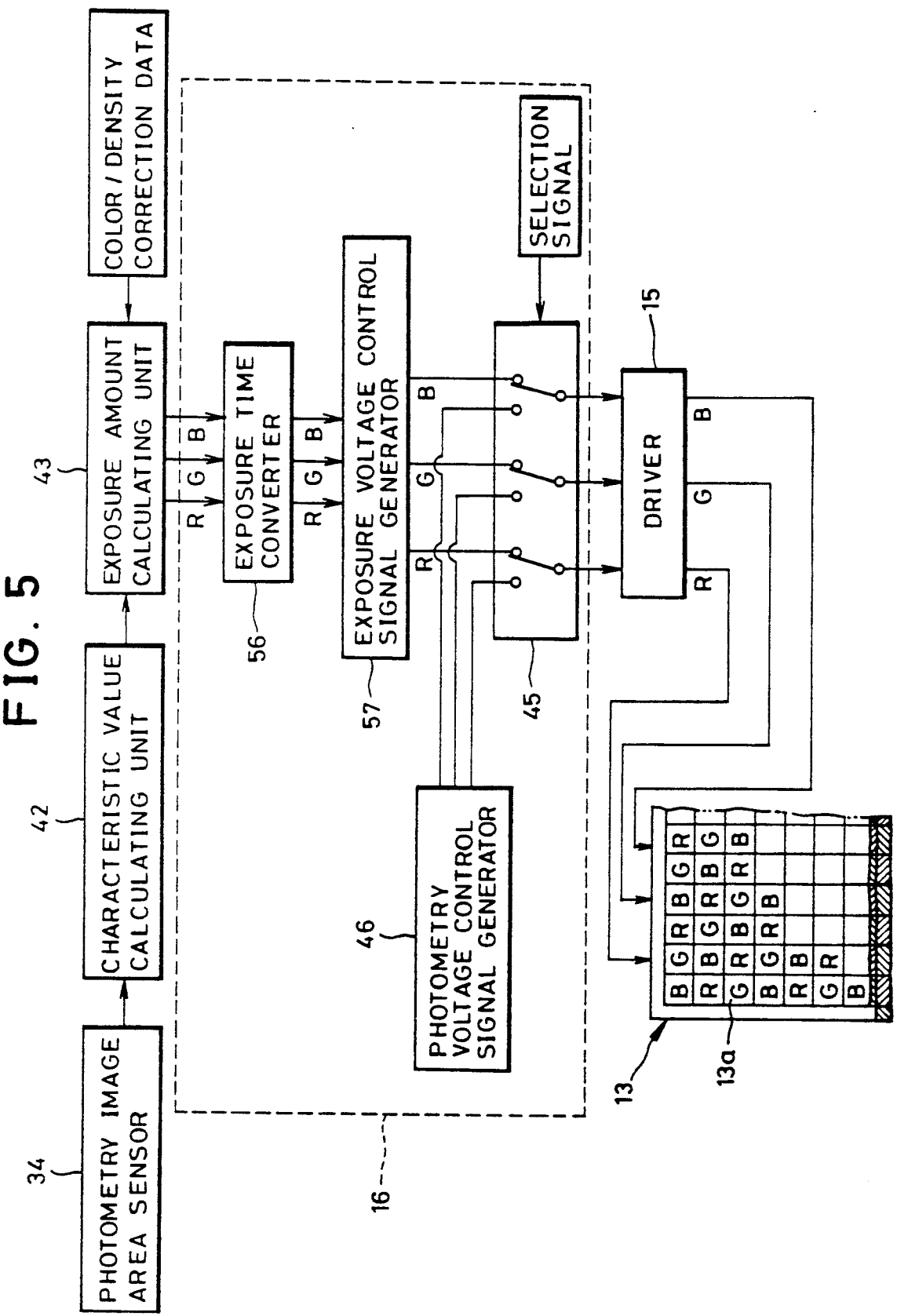
FIG. 5 is a functional block diagram of a controller according to an embodiment which uses a color liquid crystal panel as a shutter.
Figure 6:
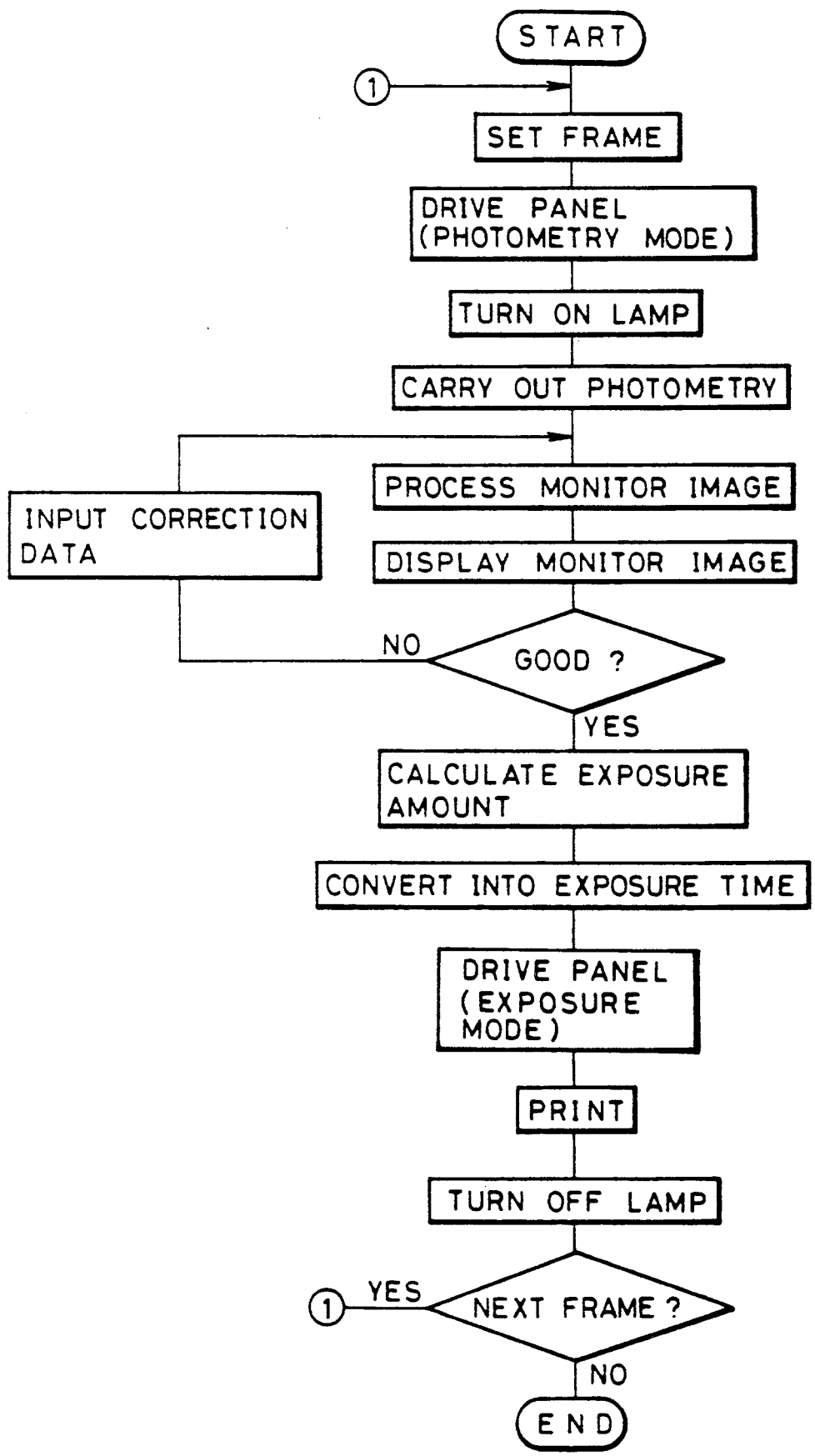
FIG. 6 is a flow chart illustrating the printing procedure of the embodiment shown in FIG. 5.

The steps of exposure amount are about 32 (5 bits) if the light amount controlling means is the color liquid crystal panel 13 for controlling the light transmittance. A photographic printer requires generally about 512 to 1024 steps (9 to 10 bits). Such a fine exposure control can be achieved by using the color liquid crystal panel 13 as a shutter which controls the exposure times of each color. FIGS. 5 and 6 show such an embodiment provided with an exposure time converter 56 and an exposure voltage control signal generator 57. The exposure time converter 56 is constructed of a table memory which has three color conversion tables representative of the relationship between exposure amounts and exposure times respectively obtained through experiments. This conversion table determines an exposure time of each color while considering the light transmittance characteristic of the color liquid crystal panel 13, and generates a signal representative of a closing timing. The exposure voltage control signal generator 57 generates a voltage control signal for setting cells to a light intercepting state in response to the closing timing signal of each color. In FIG. 5, like circuit blocks to those shown in FIG. 2 are represented by using identical reference numerals. In the above manner, the photographic printer shown in FIG. 1 can be used for the case where the color liquid crystal panel 1 is used as a shutter.

The operation of the embodiment shown in FIG. 5 will be described with reference to FIG. 6. After the inspection of a monitor image simulating a finished photoprint in the manner described above, the print key is actuated and then the selector 49 selects the exposure voltage control signal generator 57. The exposure amount calculating unit 43 calculates an exposure amount of each color. The calculated exposure amount is converted into an exposure time by the exposure time converter 56 to determine a closing timing of cells of each color. Next, the controller 16 stops applying voltages to the color liquid crystal panel 13 and sets all the cells in the exposure mode where they take the maximum light transmittance (open state). Thereafter, the black shutter 24 is opened to start exposing the color paper 23. In practice, it is necessary to consider the light transmittance characteristics of the color filter segments 14b. so that the light transmittances of cells of at least two colors are adjusted more or less.

While the color paper 23 is exposed, the exposure voltage control signal generator 57 generates a voltage control signal used for setting cells in the light intercepting state (closed state), in response to the closing timing signal from the exposure time converter 56. For example, immediately after the lapse of an exposure time corresponding to a red color exposure amount after fully opening the black shutter 24, the exposure voltage control signal generator 57 generates a voltage control signal so that red cells are applied with a voltage and take the light intercepting state, terminating the red color exposure. In such a way, the closing timing and hence the exposure time is controlled for cells of each color. After completion of red, green, and blue three color exposures, i.e., after setting all cells into the light intercepting state, the black shutter 24 is closed. Thereafter, the voltages applied to the color liquid crystal panel 13 are removed so all cells take the maximum light transmittance.

In the case of a normally closed type color liquid crystal panel, the application of voltages is stopped at the closing timing. If the open time and light transmittance of the color liquid crystal 13 are controlled in accordance with exposure amounts, a still finer exposure control can be realized.

Figure 7:
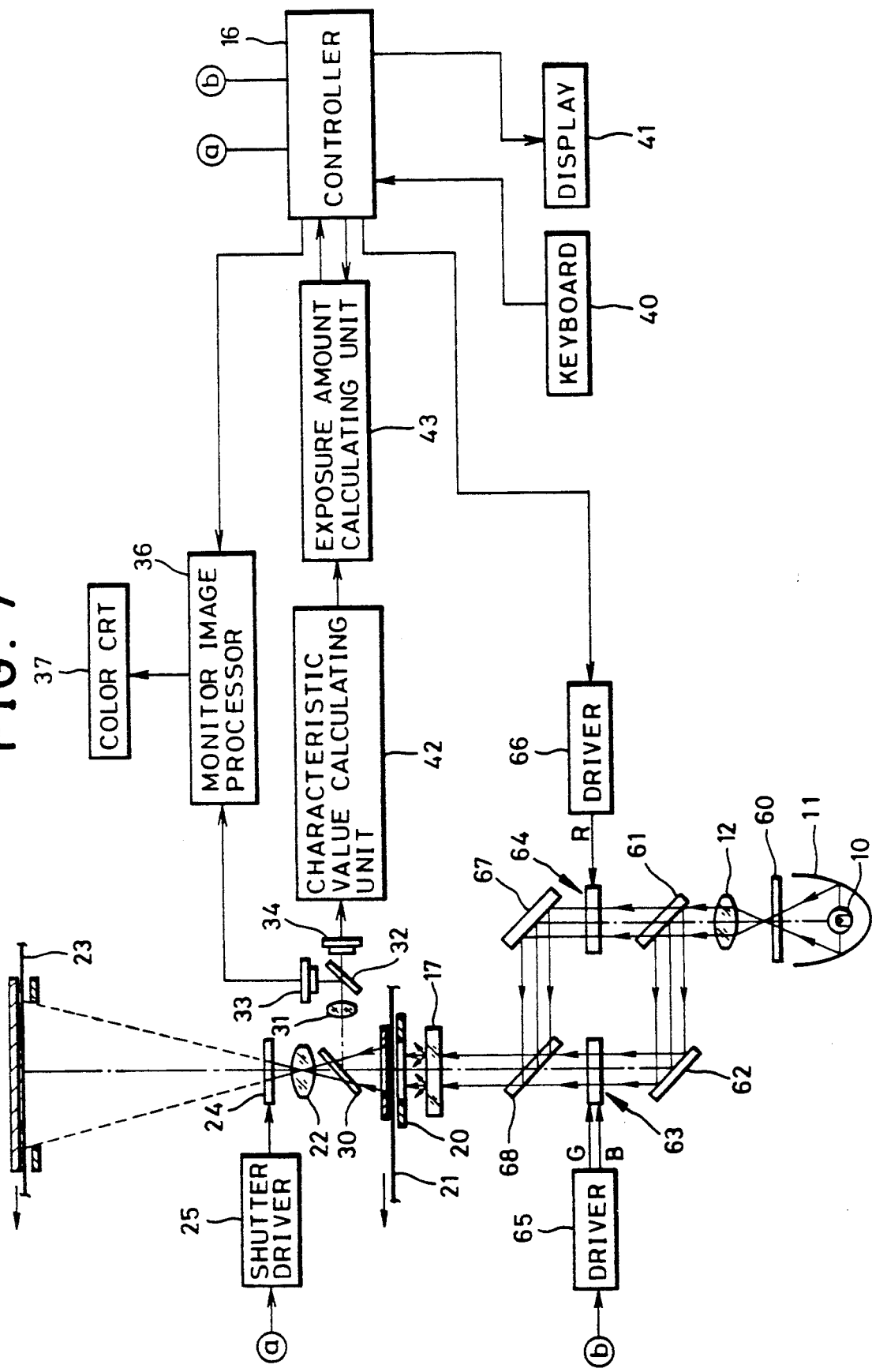
FIG. 7 is a schematic diagram of a photographic printer according to an embodiment which uses two types of color liquid crystal panels.
Figure 8:
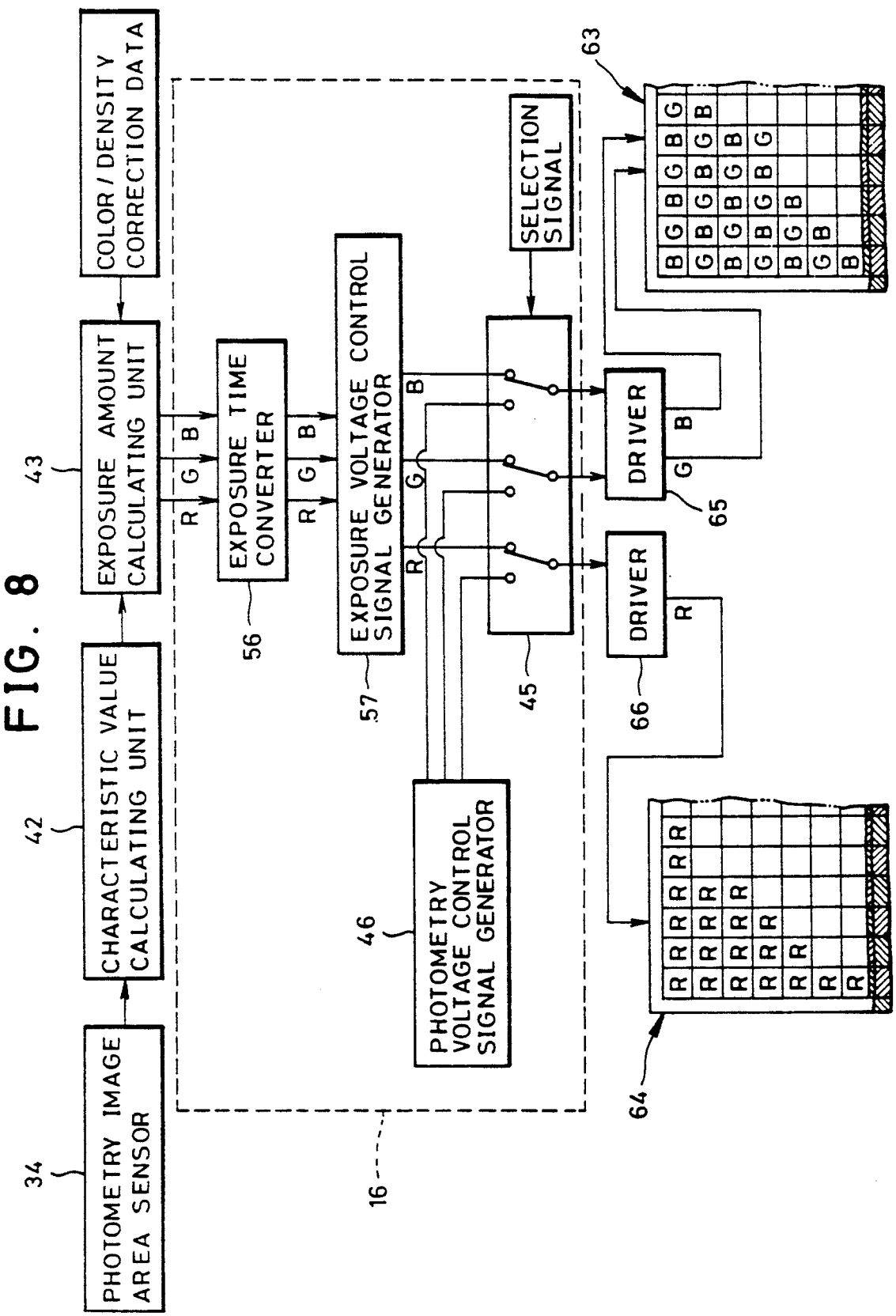
FIG. 8 is a functional block diagram of the controller shown in FIG. 7.

The color liquid crystal panel 13 uses the color filter segments 14b of an organic dye type. Therefore, a wavelength 700 nm of red necessary for the photographic printer is transmitted, causing some difficulty in controlling the red light. FIGS. 7 and 8 illustrate an embodiment providing an easy control of a red light. Like elements to those shown in FIG. 1 are represented by using identical reference numerals. Light from the lamp 10 is incident to a first dichroic filter 61 via a heat preventing filter 60 and the lens 12. This dichroic filter 61 transmits a red light from the lamp 10, and reflects a green light and blue light. The separated green and blue lights are reflected by a first mirror 62 and become incident to a color liquid crystal panel 63. A red light transmitted through the dichroic mirror 61 becomes incident to another color liquid crystal panel 64. On the color liquid crystal panel 63 as shown in FIG. 8, green and blue color filters are disposed in a mosaic pattern on light valves disposed in a matrix. The other color liquid crystal panel 64 uses evaporation type red filters which ensure optimum printing characteristics. The red filters may be omitted if the dichroic mirror 61 has a red spectral characteristic necessary for printing control. The number of cells of the color liquid crystal panels 63 and 64 is 20×20. The color liquid crystal panels 63 and 64 are of the normally open type and are driven by drivers 65 and 66 under the control of the controller 16.

Light transmitted through the color liquid crystal panel 64 is reflected by the mirror 67 and is incident to a second dichroic mirror 68. Light transmitted through the color liquid crystal panel 63 is also incident to the second dichroic mirror 68. The second dichroic mirror 68 reflects a red light and transmits a green light and blue light, so that three color lights are incident to the diffusion plate 17 with their centers of luminous flux aligned together.

In the embodiment shown in FIGS. 7 and 8, the color liquid crystal panels 63 and 64 are used as a shutter similar to the embodiment shown in FIGS. 5 and 6. After a lapse of a desired exposure time, a voltage is applied to the cells to place them in the light intercepting state. It is apparent that light amounts may be controlled in the manner as described with the embodiment shown in FIGS. 2 and 3. Separate color liquid crystal panels may be used for green and blue colors. In this case, three color liquid crystal panels are used to control the exposure amount for each color.

Figure 9:
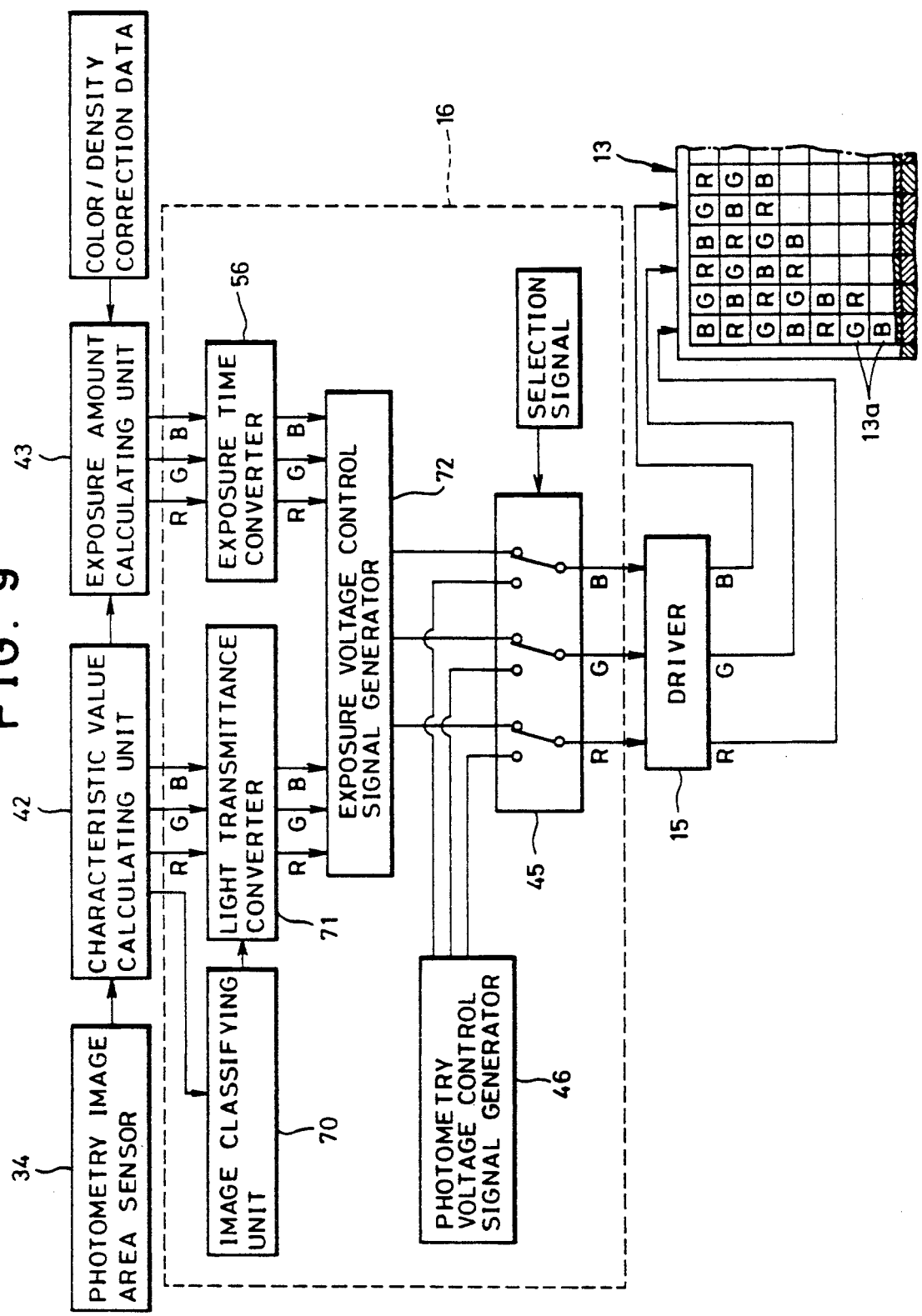
FIG. 9 is a functional block diagram of a controller according to an embodiment which changes the gradation of a photoprint in accordance with the image quality of a negative film.
Figure 10:
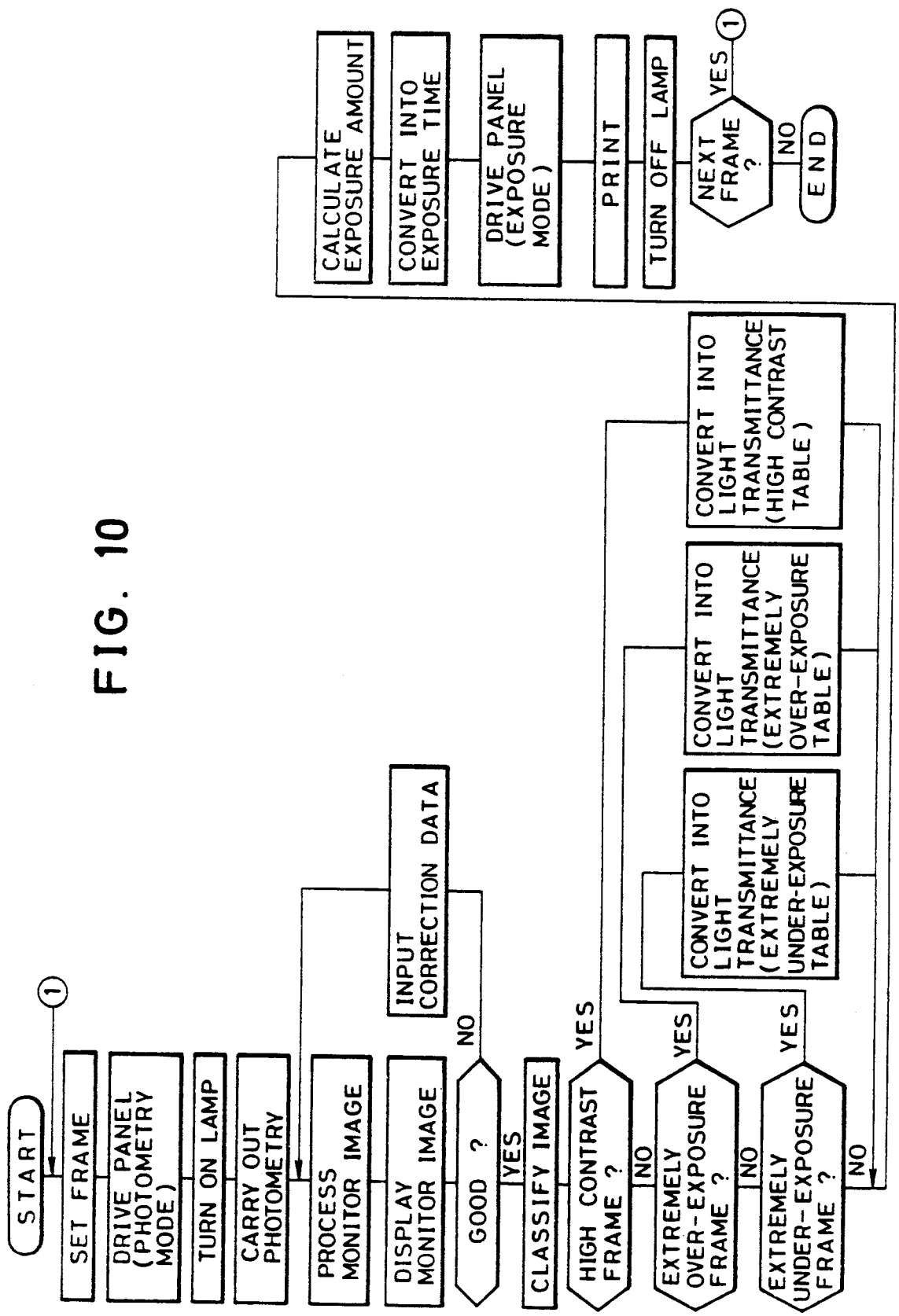
FIG. 10 is a flow chart illustrating the printing procedure of the embodiment shown in FIG. 9.

If the light transmittance of each cell is individually adjusted in accordance with the density of each point (picture element) of a frame to control the gradation of the image on the frame, it is possible to obtain a finished photoprint having either a hard or soft gradation by use of the photometry image area sensor 34 with pixels of the same number as the cells of the color liquid crystal panel 13. FIGS. 9 and 10 illustrate such an embodiment for adjusting the gradation of an image. Like circuit elements to the above-described embodiments are represented by using identical reference numerals. Referring to FIG. 9, the characteristic value calculating unit 42 sends various characteristic values to an image classifying unit 70 of the controller 16. The image classifying unit 70 discriminates between a high contrast frame, an extreme over-exposure frame, an extreme under-exposure frame, and a normal frame, based upon the various characteristic values. For example, if a difference between the maximum and minimum densities of points is equal to or larger than a predetermined value, the frame image is judged as a high contrast frame, and so the image classifying unit 70 sends a signal representing a high contrast frame to a light transmittance converter 71. If a large area transmittance density is equal to or smaller than a predetermined value, the frame image is judged as an extreme over-exposure frame. If, for example, the large area transmittance is larger than the predetermined value, the frame image is judged as an extreme under-exposure frame. If a frame image is not judged as any of the high contrast, extreme over-exposure, and extreme under-exposure frames, then it is judged as a normal frame.

The light transmittance converter 71 has conversion tables for the high contrast, extreme over-exposure, and extreme under-exposure frames. The light transmittance converter 71 selects one of the conversion tables in accordance with a classification signal from the image classifying unit 70, and obtains the light transmittance individually of each cell 13a of each color R, G, and B in accordance with the photometric data at the corresponding point of the frame image supplied from the characteristic value calculating unit 42. In the case of a normal frame, the maximum light transmittance is used. A signal representing a light transmittance of each cell is sent to an exposure voltage control signal generator 72 which then generates a voltage control signal, in accordance with the exposure amount from the exposure amount calculating unit 43 and the light transmittance of each cell from the light transmittance converter 71, and sends it to the driver 15 via the selector 45.

Next, the operation of the embodiment shown in FIG. 9 will be described with reference to FIG. 10. After inspecting a monitor image in the manner described previously, a print key is actuated. Then, the image classifying unit 70 discriminates the frame to be printed between a high contrast frame, extreme over-exposure frame, extreme under-exposure frame and a normal frame, on the basis of various characteristic values from the characteristic value calculating unit 42.

If the frame to be printed is judged as a normal frame, the exposure amount calculating unit 43 calculates a printing exposure amount of each color from the correction data and various characteristic values with well known exposure calculating equations. The closing timing of each cell 13a of the color liquid crystal panel 13 is determined color by color from the printing exposure amount for each color. Next, the controller 16 stops applying a voltage to each cell 13a and sets it to the maximum light transmittance. At the same time, the shutter 24 is opened for a predetermined period during which the negative image is focussed onto the color paper 23. During this exposure, upon reception of the closing timing signal sent from the controller 16, the driver 15 applies the voltage to the cells for each color to set them in the light intercepting state, thereby cutting the printing light corresponding to the color of which the exposure amount is obtained. When the black shutter 24 is closed, the voltage applied to the color liquid crystal panel 13 is removed.

If the image classifying unit 70 judges that a frame to be printed is either a high contrast frame, an extreme over-exposure frame or an extreme under-exposure frame, then the light transmittance converter 71 selects the corresponding conversion table to determine individually the light transmittance of each cell corresponding to a point of the frame in accordance with the photometric data. The voltage control signal generator 72 generates a voltage control signal corresponding to the light transmittance of each cell, and sends it to the driver 15. The driver 15 outputs a voltage corresponding to the voltage control signal for each cell individually to set each cell 13a to a desired light transmittance. In this manner, the color liquid crystal panel 13 is given a gradation control suitable for a classified frame pattern, because the light amount is adjusted in accordance with the image pattern of the frame to be printed. Thereafter, for example, after lapse of a red light exposure time period determined by the exposure time converter 56, the voltage signal generator 72 applies a large voltage to the red cells sufficient for intercepting light to the red cells. When exposure of each color is terminated, the black shutter 24 is closed.

In the above embodiment, the extreme over-exposure, extreme under-exposure, and high contrast frames are automatically discriminated in accordance with various characteristic values supplied from the characteristic value calculating unit 42. Such discrimination may be performed by an operator when inspecting a negative image. In this case, the conversion table of the light transmittance converter 71 is selected as the operator designates. Furthermore, the light transmittance of each cell 13a is individually changed to carry out a gradation control of each cell. Instead, the period for maintaining a light transmitting state of each cell may be changed to carry out a gradation control, or both methods may be used at the same time. The exposure unevenness correction to be described with FIGS. 13 to 16 may be used when carrying out a gradation control of each cell.

Figure 11:
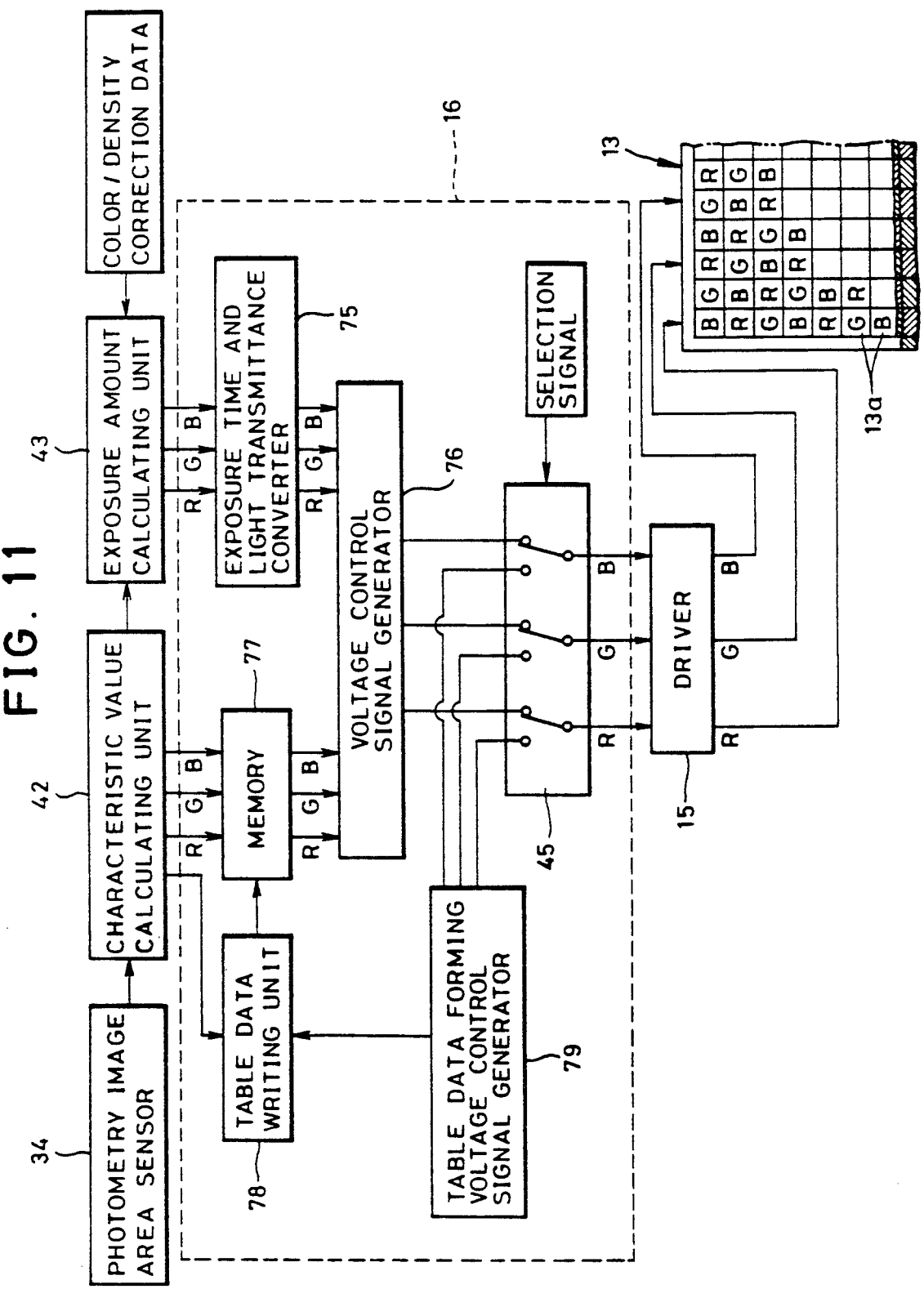
FIG. 11 is a functional block diagram of a controller according to an embodiment which controls a color liquid crystal panel by using table data representative of a relationship between an applied voltage and corresponding light transmittance of each cell.
Figure 12:
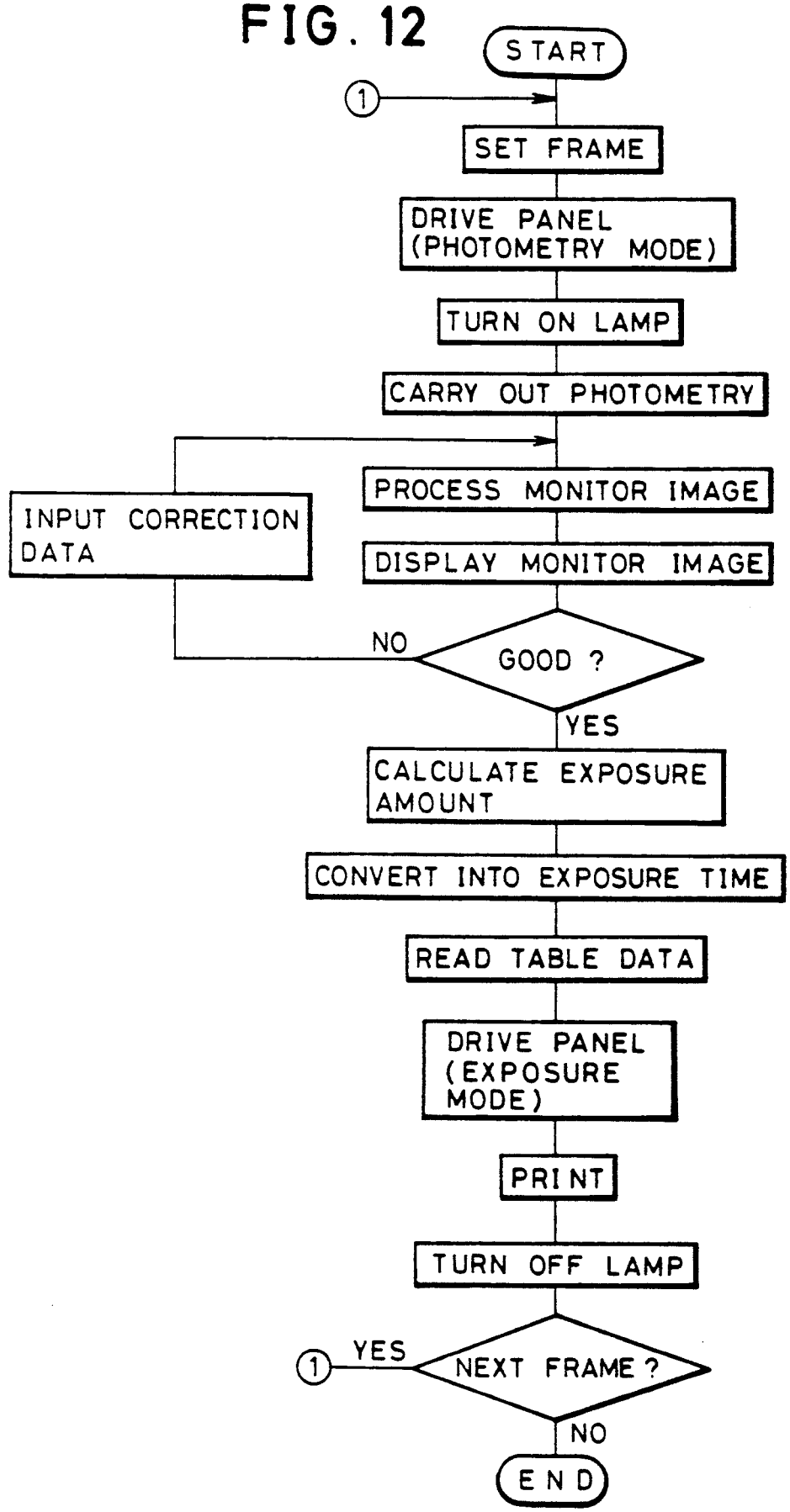
FIG. 12 is a flow chart illustrating the printing procedure of the embodiment shown in FIG. 11.

The color liquid crystal panel 13 has a nonlinear relationship between a cell drive signal and a resultant light transmittance, the relationship changing with temperature and depending on each particular color liquid crystal panel. FIGS. 11 and 12 illustrate an embodiment capable of providing high precision exposure control. An exposure time and light transmittance converter 75 determines a combination of a light transmittance and an exposure time for each color in accordance with the exposure amount, and sends it to the voltage control signal generator 76. The voltage control signal generator 76 determines cell drive voltages for each color corresponding to the light transmittance from table data in a memory 77 to thereby generate voltage control signals for each color of cells in accordance with the determined voltages and exposure time.

In the table data generating mode, a table data forming voltage control signal generator 79 of the controller 16 supplies predetermined voltage control signals to the driver 15 via the selector 45 to drive the color liquid crystal panel 13. Actual light transmittances of the cells of the color liquid crystal panel 13 are measured with the photometry image area sensor 34. An average of measured values for the respective pixels is obtained as photometric data, which is sent via the characteristic value calculating unit 42 to the memory 77. A table data writing unit 78 writes the actual light transmittances for each color of cells together with corresponding cell drive voltage data, in the memory 77 at predetermined areas to obtain three table data. The table data are formed for each step of cell drive voltages which increase stepwise. The table data are renewed periodically, at any desired time, or at the time when the temperature of the color liquid crystal changes. It is convenient if the table data are prepared for each ambient temperature, allowing to selectively use it. Table data may be also prepared for each of the cells, for which an image area sensor capable of photometry for each cell is used.

FIG. 12 illustrates the printing procedure of the embodiment shown in FIG. 11. As described before, upon actuation of the print key after inspecting a display image, the exposure amount calculating unit 43 calculates an exposure amount for each color, and the exposure time and transmittance calculating unit 75 determines a light transmittance and an exposure time for each color of cells. The voltage control signal generator 76 refers to the table data in the memory 77, generates voltage control signals corresponding to the light transmittance for each color, and sends them to the driver 15. At the same time, the shutter driver 25 causes the shutter 24 to open for a predetermined time period, so that a negative image is focussed on the color paper 23 and exposure starts. The driver 15 drives the cells 13a for each color to close them at a predetermined timing and cut a printing light for each color of which the determined exposure amount is reached. In the above manner, while referring to the table data in the memory 77, cell drive voltages for each color are determined in accordance with the transmittance of the color. It is therefore possible to correctly determine the light transmittance of cells while correcting influences from the variation of the characteristics of each color liquid crystal panel and a temperature change. The color liquid crystal panel 13 is used as a shutter and a diaphragm, and the exposure amount is controlled by the light transmittance for each color of cells and the time period of maintaining each cell at that transmittance. The exposure control may be carried out only by controlling the light transmittance as described in FIG. 2. Although the transmittance of each cell is changed by applying a changed voltage, a changed current may also be used alternatively.

Figure 13:
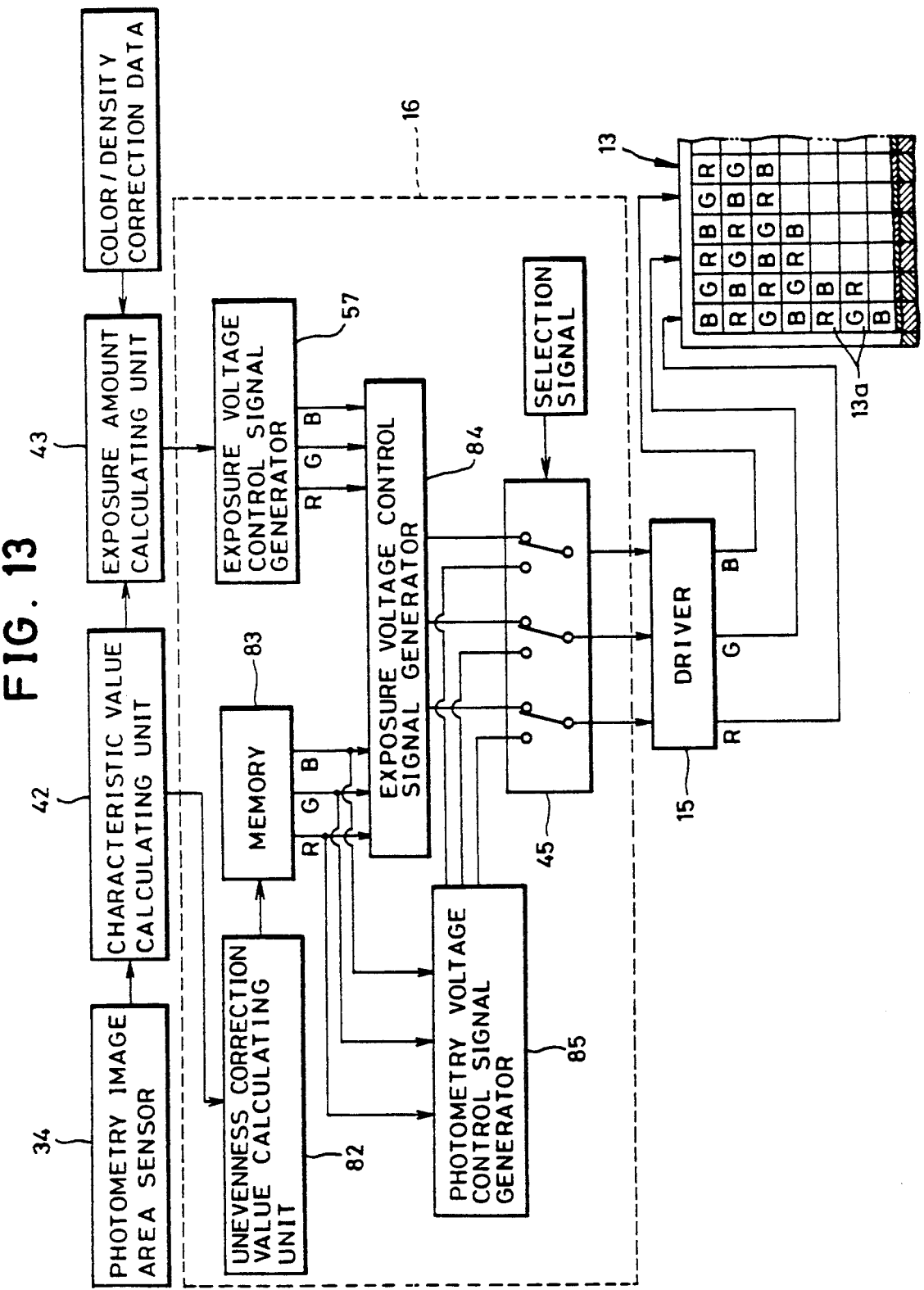
FIG. 13 is a functional block diagram of a controller according to an embodiment which corrects unevenness caused by optical elements.
Figure 14:
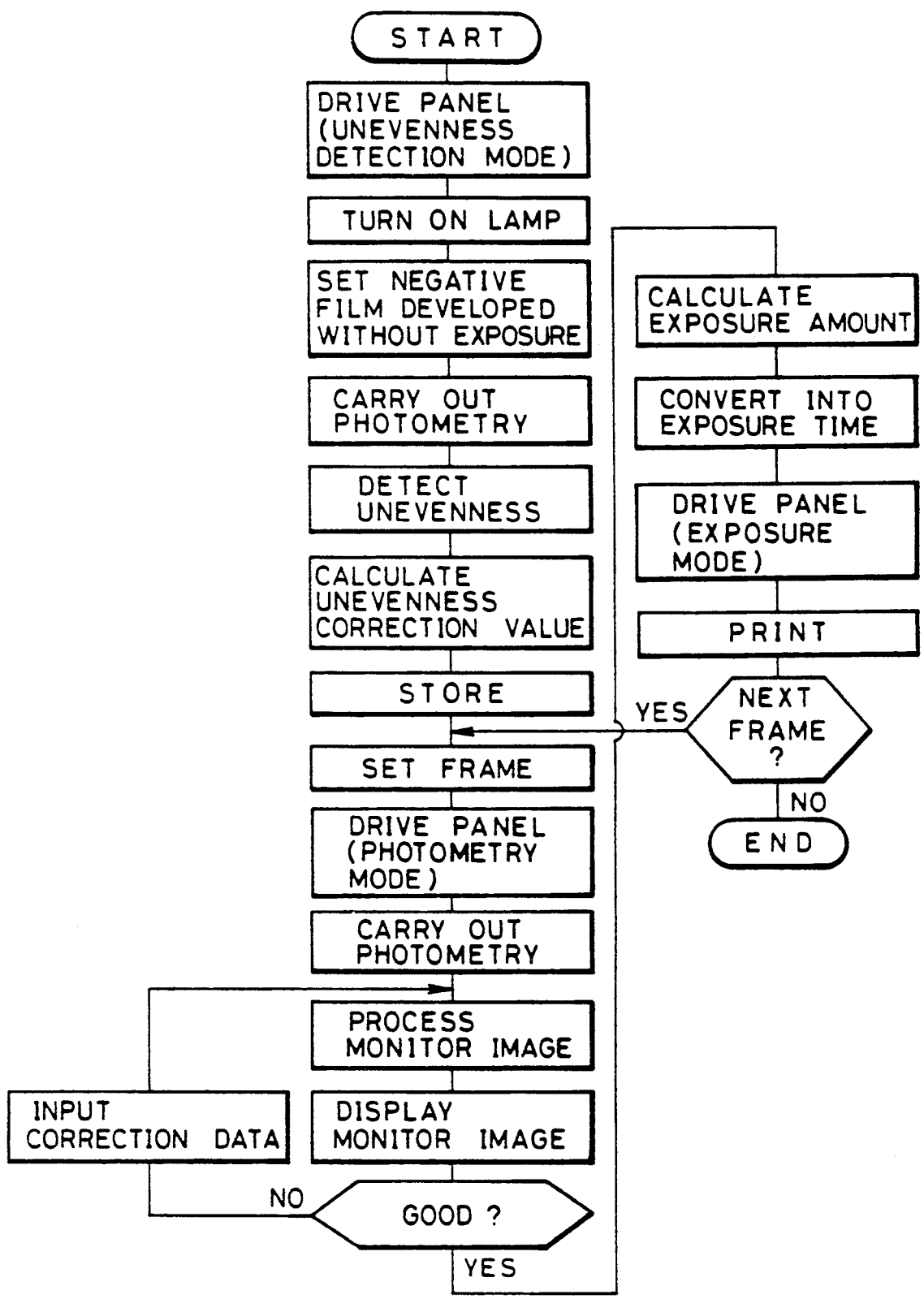
FIG. 14 is a flow chart illustrating the printing procedure of the embodiment shown in FIG. 13.

The density and color balance of a photoprint at each position change with the light emission characteristic of the lamp 10. This can be solved by adjusting the light transmittance of each cell individually of the color liquid crystal panel 13 in accordance with the pattern of light source unevenness. FIGS. 13 and 14 illustrate an embodiment which corrects the unevenness of the light emission characteristic of the lamp 10 to thereby provide a photoprint having a uniform density and color balance over the whole area. The photometry image area sensor 34 herein has pixels of the same number as the cells of the color liquid crystal panel 13. In the unevenness detecting mode, a negative film developed without exposure (not shown) is set at the film carrier 20. Light transmitted through the negative film is subject to three color separation photometry by using the photometry image area sensor 34. The characteristic value calculating unit 42 calculates the density at each point of each separated color, using the color signal from the image area sensor 34, and sends the density to an unevenness correction value calculating unit 82. This unit 82 derives the maximum density from calculated densities within one frame. Next, differences between the maximum density and respective densities at other points are obtained. The differences are sent to the controller 16 as unevenness correction values and stored in a memory 83. Obviously, the unevenness correction values are obtained for each color.

The exposure voltage control signal generator 84 is constructed of a table memory. While referring to table data stored in the table memory, the exposure voltage control signal generator 84 converts the unevenness correction values read from the memory 83 into voltage control signals which are sent to the driver 15 via the selector 45. Each cell is thereby individually a light transmittance corresponding to its unevenness correction value. This light transmittance is maintained for the exposure time period of each color. The cells 13a of the color liquid crystal panel 13 are therefore driven by voltages having a pattern capable of eliminating unevenness of the lamp 10, thereby canceling the unevenness and providing the exposure control. The table data representative of the relationship between unevenness correction values and cell drive voltages is prepared beforehand through experiments and stored in the exposure voltage control signal generator 84.

The operation of the embodiment shown in FIG. 13 will be described with reference to FIG. 14. The unevenness detecting mode is executed at the beginning of operating the printer. In this unevenness detecting mode, the photometry voltage signal generator 85 generates voltage signals matching the dynamic ranges of the image area sensors 33 and 34 to set all the cells 13a of the color liquid crystal panel 13 to the same light transmittance. After a negative film developed without exposure is set to the film carrier 20, the lamp 10 is turned on. Light emanated from the lamp 10 transmits through the color liquid crystal panel 13 to illuminate the film. This film developed without exposure is measured by the image area sensor 34, and the three color signals thus obtained are sent to the characteristic value calculating unit 42 where the color signals are converted into density signals of three separated colors which are then supplied to the unevenness correction value calculating unit 82. The unevenness correction value calculating unit 82 obtains differences between the maximum density and densities at other points within one frame for each color and stores them as the unevenness correction values into the memory 83 in order to obtain the same density at any of all the points of the film developed without exposure.

After the unevenness detecting mode, as described previously, the negative film 21 is set to the film carrier 20 and the frame to be printed is illuminated by the lamp 10. At this time, the voltage control signals are sent from the photometry voltage signal generator 85 of the controller 16 to the driver 15 so that the color liquid crystal panel 13 is driven in the photometry mode. In this case, the voltage determined while considering the dynamic ranges of the image area sensors 33 and 34 is added to each voltage corresponding to the unevenness correction value of each cell read from the memory 83. The resultant voltage is used individually for driving the cell. In this manner, the light transmittance of each cell 13a is individually adjusted to eliminate the unevenness of the lamp 10.

As described previously, upon actuation of the print key, the exposure amount for each color is calculated and sent to the exposure time converter 57 to determine the timing when the cells for each color are set to the light intercepting state. The exposure voltage control signal generator 84 generates an individual voltage control signal of each cell corresponding to the unevenness correction value. Immediately thereafter, the selector 45 selects the exposure voltage control signal generator 84 and the color liquid crystal panel 13 is set to the exposure mode. In this exposure mode, each cell 13a has a light transmittance finely adjusted from the maximum light transmittance without any applied voltage, so as to eliminate the influence from the light source unevenness.

The color liquid crystal panel 13 is set to the exposure mode and thereafter, the shutter 24 is opened for a predetermined time period. While the shutter 24 is opened, the driver 15 causes cells of each color to exhibit the light intercepting state at the closing timing for the color to thereby control the exposure time for the color. Since the light transmittance of each cell 13a is individually constrained so as to eliminate the unevenness of the lamp characteristic, the influences of unevenness characteristic of the lamp 10 can be removed. Since the data for correcting the light source unevenness is stored in the memory 83, this data is used for printing a following frame after setting the frame at the printing stage and setting the color liquid crystal panel 13 to the photometry mode. Obviously, not only the light source unevenness but also the variation of characteristics of cells of the color liquid crystal panel can be corrected. In the above embodiment, only the light source unevenness is corrected. In addition to the light source unevenness, the unevenness caused by the printing lens 22 and black shutter 24 may be corrected. In this case, the light amount ratio at the peripheral area relative to the central area of the printing lens is obtained in advance for each print magnification factor, and the unevenness characteristics of the black shutter 24 is obtained in advance for each exposure time. These unevenness characteristics are obtained through experiments at the stage of designing or manufacturing, and stored in the memory 83. Cells of the color liquid crystal panel 13 are driven during printing so as to have a pattern opposite to the unevenness characteristics.

Figure 15:
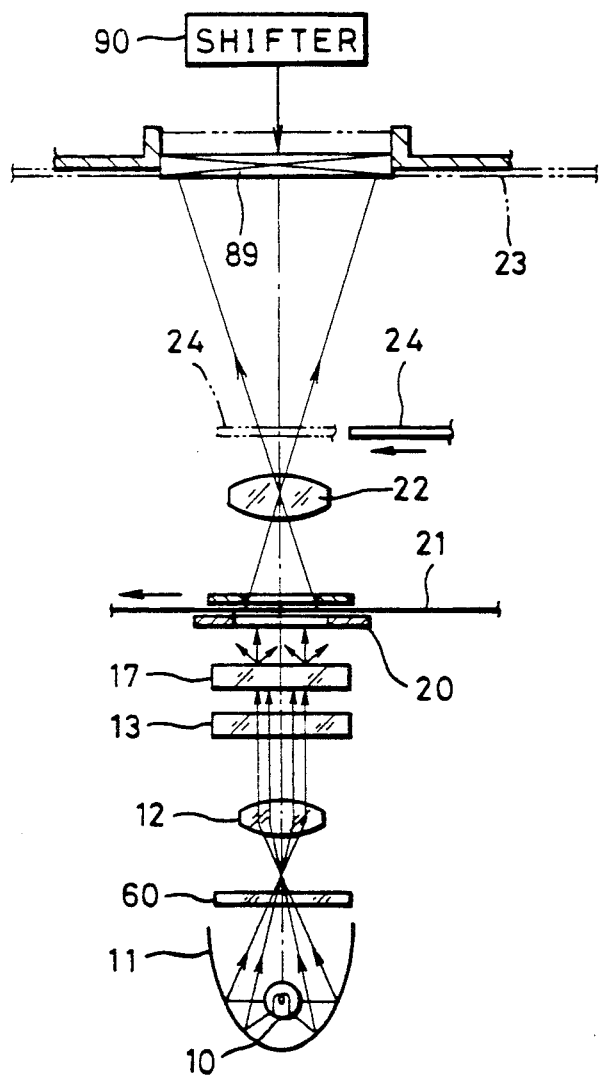
FIG. 15 is a schematic diagram of a photographic printer according to an embodiment which mounts an unevenness detector at the exposure plane.
Figure 16:
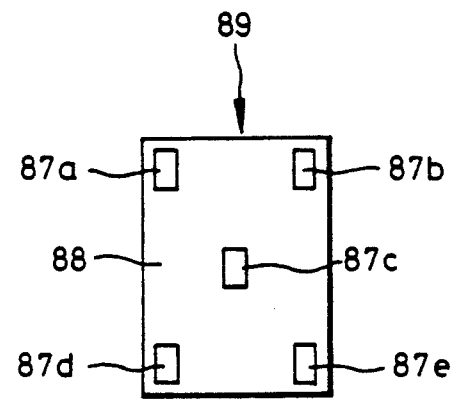
FIG. 16 is a plan view of the unevenness detector shown in FIG. 15.

FIGS. 15 and 16 illustrate an embodiment wherein an unevenness detector 89 is removably mounted at the position flush with the photosensitive surface of the color paper 23. Like elements to those shown in FIG. 1 are represented by using identical reference numerals. The unevenness detector 89 is constructed of a sensor mounting plate 88 and sensors 87a to 87e mounted at four corners and the central area of the plate 88. The sensors 87a to 87e are storage type sensors. The sensor mounting plate 88 is advanced by the shifter 90 during the photometry mode to align the sensors 87a to 87e so as to be flush with the photosensitive surface of the color paper 23. During the printing mode, it is retracted to the position allowing the color paper 23 to be freely transported. In this embodiment, since the sensors 87a to 87e are set at the exposure stage of the color paper 23, it is possible to collectively detect not only the unevenness caused by the lamp 10, but the exposure unevenness caused by the peripheral light amount ratio of the printing lens 22 and the shutter 24. In the same manner as the above embodiment, the color liquid crystal panel 13 is driven so as to cause the area having a lower density to rise up to the higher density. The unevenness caused by the lamp 10, printing lens 23, and black shutter 24 can be collectively eliminated. In this embodiment, five sensors 87a to 87e are provided to divide a frame into five areas to measure the unevenness at each area. More sensors may be disposed for example in matrix to detect the unevenness more finely.

In the above embodiment, a frame having a flat characteristic is finished as a photoprint having a flat characteristic eliminating the total unevenness. However, since there is a frame having a poor light amount ratio at the central area relative to the peripheral area depending upon a camera, it is preferable to provide a correction to make the central area brighter and the peripheral area darker. Such correction is realized by separately driving cells of the liquid crystal panel to provide total brightness. In such case, several types of correction patterns are prepared in advance and the optimum one is selected upon monitoring the display image. Unevenness is eliminated by changing individually the light transmittance of each cell 13a in the exposure mode. Instead of controlling the light transmittance, the exposure time or both the light transmittance and light amount may be controlled individually for each cell to eliminate the unevenness.

In the above embodiments, the color liquid crystal panel 13 is used as the color light intensity controlling means. A PLZT may be used instead. Furthermore, as shown in FIGS. 9 to 10 and 13 to 16, to adjust the light transmittance of each cell in accordance with the photometric data, it is preferable to omit the diffusion plate or use a diffusion plate having a low diffusing capability. Still further, although a mini-laboratory type photographic printer which inspects each frame before printing has been described, the present invention is applicable to a large-laboratory type photographic printer which inspects all frames before printing and thereafter printing them using the inspection data. Various changes and modifications of this invention are possible which are construed to be within the protective scope of this invention.

What is claimed:

1. A photographic printer for projecting a color image recorded in a photographic film onto a color paper through a printing lens and creating the color image on the color paper, comprising:

a light source for illuminating said photographic film; color light intensity controlling means disposed between said light source and said photographic film, said color light intensity controlling means having a plurality of cells disposed in a matrix, and each of said cells having a light valve whose light transmittance changes with a drive signal applied thereto and a filter of one of the three primary colors; and control means for controlling the light transmittance of each of said cells.

2. A photographic printer according to claim 1, wherein said color light intensity controlling means is a color liquid crystal panel.

3. A photographic printer according to claim 1, further comprising a sensor for performing photometry of said photographic film, and means for calculating an exposure amount in accordance with a photometric data from said sensor.

4. A photographic printer according to claim 3, wherein said sensor is a color image area sensor.

5. A photographic printer according to claim 4, further comprising a monitoring system including a second color image area sensor for picking up said color image, means for processing a signal supplied from said second color image sensor so as to form an image simulating a finished photoprint of said color image, and a color monitor for displaying said simulating image.

6. A photographic printer according to claim 5, wherein said control means adjusts all of said cells during said photometry to keep a predetermined light transmittance so as to prevent said second color image area sensor from saturating.

7. A photographic printer according to claim 3, wherein said color light intensity controlling means is set to a de-focussing position of said printing lens.

8. A photographic printer according to claim 3, wherein there is provided a diffusion plate for diffusing light, said diffusion plate being disposed between said color light intensity controlling means and said photographic film.

9. A photographic printer according to claim 3, wherein there are provided an infrared ray cut filter and an ultraviolet ray cut filter, said filters being disposed between said light source and said color light intensity controlling means.

10. A photographic printer according to claim 3, wherein said control means adjusts said cells to keep the same light transmittance in accordance with said exposure amount.

11. A photographic printer according to claim 3, wherein said control means controls the time period of maintaining a light transmitting state of each of said cells in accordance with said exposure amount, thereby using said color light intensity controlling means as a shutter.

12. A photographic printer according to claim 3, wherein said control means controls the light transmittance of each of said cells and the time period of maintaining said light transmittance in accordance with said exposure amount, whereby said color light intensity controlling means serves as a light amount adjusting means and a shutter.

13. A photographic printer according to claim 1, wherein said control means controls individually the light transmittance of each of said cells so as to correct the density unevenness and color unevenness caused by optical elements.

14. A photographic printer according to claim 1, wherein said control means adjusts individually the light transmittance of each of said cells in a position corresponding to each point within a frame, in accordance with a photometric value at said point, to control the gradation.

15. A photographic printer according to claim 1, further comprising means for classifying a frame into a high contrast frame, an under-exposure frame, and an over-exposure frame in accordance with photometric values at respective points within a frame, and said control means adjusts individually the light transmittance of each of said cells in accordance with the classification result obtained by said classifying means, to control the gradation.

16. A photographic printer according to claim 1, further comprising a memory for storing table data representative of the relationship between said drive signal for said cells and
said light transmittance, means for determining said light transmittance of said cells in accordance with said exposure amount, and means for converting said determined light transmittance into said drive signal by referring to said table data.

17. A photographic printer for printing a color image recorded in a photographic film on a color paper, comprising:
a light source for illuminating said photographic film;
means for spectrally separating light of said light source into a red light ray and other light rays;
first color light intensity controlling means disposed in an optical path of said red light ray separated by said spectrally separating means, said first color light intensity controlling means having a plurality of cells disposed in a matrix, and each of said cells having a light valve whose light transmittance changes with a drive signal applied thereto and a red color filter;
second color light intensity controlling means disposed in an optical path of said other light rays, said second color light intensity controlling means having a plurality of cells disposed in a matrix, and each of said cell having a light valve whose light transmittance changes with a drive signal applied thereto and a mosaic filter of blue and green colors;
superposing means disposed in front of said photographic film for superposing light transmitted from said first and second color light intensity controlling means; and
control means for controlling the light transmittance of each of said cells of said first and second color light intensity controlling means.

18. A photographic printer according to claim 17, wherein said first and second color light intensity controlling means are each a color liquid crystal panel.

19. A photographic printer according to claim 18, wherein said spectrally separating means and said superposing means are each a dichroic mirror.

20. A photographic printer for printing a color image recorded in a photographic film on a color paper, comprising:
a light source for illuminating said photographic film;
a color liquid crystal panel disposed between said light source and said photographic film, said color liquid crystal panel having a plurality of cells disposed in a matrix, and each of said cells having a light valve whose light transmittance changes with a drive voltage applied thereto and a color filter of one of three primary colors;
means for performing a three color separation photometry of each point of said color image to obtain a photometric data; and
means for controlling said drive voltage of each of said cells of said color liquid crystal panel in accordance with said photometric data at said each point corresponding to each of said cells, while said color paper is exposed.

21. A photographic printer according to claim 20, wherein said control means comprises a classifying section for classifying a frame to be printed into a high contrast frame, an under-exposure frame, and an over-exposure frame in accordance with said photometric data, and a section for generating said drive voltage of each of said cells in accordance with the classification result obtained by said classifying section.

22. A photographic printer for printing a color image recorded in a photographic film on a color paper, comprising:
a light source for illuminating said photographic film;
a color liquid crystal panel disposed between said light source and said photographic film, said color liquid crystal panel having a plurality of cells disposed in a matrix, and each of said cells having a light valve whose light transmittance changes with a drive voltage applied to said cell and a color filter of one of three primary colors;
means for performing a three color separation photometry of each point of said color image to obtain a photometric data;
means for calculating an exposure amount in accordance with said photometric data;
means for forming table data representative of the relationship between said drive voltage and light transmittance by changing said drive voltage applied to each of said cells and measuring light passed through said color liquid crystal panel transmittance with said photometry performing means;
means for storing said table data; and
control means for adjusting a drive voltage of each of said cells in accordance with said table data after obtaining a drive voltage from said exposure amount, when exposing said color paper.

23. A photographic printer for printing a color image recorded in a photographic film on a color paper, comprising:
a light source for illuminating said photographic film;
a color liquid crystal panel disposed between said light source and said photographic film, said color liquid crystal panel having a plurality of cells disposed in a matrix, and each cell having a light valve whose light transmittance changes with a drive voltage applied thereto and a color filter of one of three primary colors;

means for detecting an exposure unevenness; and control means for controlling individually said drive voltage of each of said cells in accordance with said detected exposure unevenness, when exposing said color paper.

24. A photographic printer according to claim 23, wherein said exposure unevenness detecting means is disposed on a focussing plane of said color paper in a manner retractible therefrom.

25. A photographic printer according to claim 24, wherein said exposure unevenness detecting means is a storage type sensor.

* * * * *